(12) United States Patent
Knecht

(10) Patent No.: US 12,058,978 B2
(45) Date of Patent: Aug. 13, 2024

(54) TOILET SEAT FOR ANIMALS

(71) Applicant: Stephen Jeffrey Knecht, Lincroft, NJ (US)

(72) Inventor: Stephen Jeffrey Knecht, Lincroft, NJ (US)

(73) Assignee: Stephen Jeffrey Knecht

( * ) Notice: Subject to any disclaimer, the term of this patent is extended or adjusted under 35 U.S.C. 154(b) by 124 days.

(21) Appl. No.: 17/234,242

(22) Filed: Apr. 19, 2021

(65) Prior Publication Data
US 2021/0321588 A1 Oct. 21, 2021

Related U.S. Application Data

(60) Provisional application No. 63/011,393, filed on Apr. 17, 2020.

(51) Int. Cl.
*A01K 1/01* (2006.01)

(52) U.S. Cl.
CPC .................................. *A01K 1/0121* (2013.01)

(58) Field of Classification Search
CPC .................................................... A01K 1/0121
USPC ........................................................ 119/162
See application file for complete search history.

(56) References Cited

U.S. PATENT DOCUMENTS

| | | | | |
|---|---|---|---|---|
| 54,480 | A * | 5/1866 | Alexander | A47K 13/06 4/235 |
| 2,053,594 | A * | 9/1936 | Albert | A01K 1/0121 4/445 |
| 2,450,607 | A * | 10/1948 | Sheffield | A47K 3/26 4/445 |
| 2,584,656 | A * | 2/1952 | Anderson | A01K 1/0121 D24/123 |
| 3,603,290 | A * | 9/1971 | O'Rork | A01K 1/0121 119/162 |
| 3,672,331 | A * | 6/1972 | Brody | A47K 13/00 119/162 |
| 3,688,742 | A * | 9/1972 | McGee | A01K 1/0121 4/235 |
| 3,757,738 | A * | 9/1973 | Hall | A01K 1/0121 4/239 |
| 3,949,429 | A * | 4/1976 | Hall | A01K 1/0121 4/239 |
| 4,181,096 | A * | 1/1980 | Grubman | A47K 13/06 119/162 |
| 4,437,430 | A * | 3/1984 | DeBardeleben | A01K 1/0121 4/300.3 |
| 4,461,046 | A * | 7/1984 | Adams | A47K 13/06 4/235 |
| 5,027,451 | A * | 7/1991 | Wooten | A01K 1/0121 4/313 |

(Continued)

FOREIGN PATENT DOCUMENTS

KR 20120015841 A * 8/2010
KR 102112815 B1 * 12/2018

*Primary Examiner* — Morgan T Jordan
(74) *Attorney, Agent, or Firm* — Gearhart Law, LLC

(57) ABSTRACT

Described herein is a toilet seat capable of being coupled to an existing toilet bowl enabling the toilet to be used by animals. Further, the toilet seat can be used in training an animal to use a toilet as opposed to going outside or using a litter box. The toilet seat has a platform for the animal to rest upon as well as a number of inserts configured to help with training the animal to use the toilet.

9 Claims, 9 Drawing Sheets

(56) References Cited

U.S. PATENT DOCUMENTS

| | | | | |
|---|---|---|---|---|
| 5,103,772 A | * | 4/1992 | Schmid | A01K 1/0121 4/239 |
| 5,161,263 A | * | 11/1992 | Geneve | A47K 11/06 4/239 |
| 5,458,089 A | * | 10/1995 | Rymer | A01K 1/0121 4/239 |
| 5,884,341 A | * | 3/1999 | Boardman | A47K 13/06 4/242.1 |
| 6,418,880 B1 | * | 7/2002 | Chiu | A01K 1/0121 119/162 |
| 6,449,780 B1 | * | 9/2002 | Merry | A47K 13/06 4/235 |
| 6,701,539 B1 | * | 3/2004 | Hogan | A47K 13/06 4/235 |
| 6,860,231 B1 | * | 3/2005 | Rus | A01K 1/0121 119/165 |
| 7,882,805 B2 | * | 2/2011 | Yu | A01K 1/0121 119/165 |
| 7,963,251 B2 | * | 6/2011 | Lapidge | A01K 1/0121 119/162 |
| 8,051,804 B1 | * | 11/2011 | Rescate | A01K 1/0121 119/162 |
| 8,671,888 B1 | * | 3/2014 | Lei | A01K 1/0121 119/162 |
| 9,232,766 B1 | * | 1/2016 | Strohdach, Sr. | A01K 1/0121 |
| D789,002 S | * | 6/2017 | Slone | D30/161 |
| 2002/0078899 A1 | * | 6/2002 | Chiu | A01K 1/0121 119/162 |
| 2007/0017023 A1 | * | 1/2007 | Berube | A47K 13/24 4/661 |
| 2008/0202439 A1 | * | 8/2008 | Lapidge | A01K 1/0121 119/162 |
| 2009/0211530 A1 | * | 8/2009 | Yu | A01K 1/0121 119/162 |
| 2011/0253063 A1 | * | 10/2011 | Lapidge | A01K 1/0121 119/162 |
| 2015/0075437 A1 | * | 3/2015 | Karr | A01K 1/011 119/165 |
| 2019/0059316 A1 | * | 2/2019 | Do | B02C 18/2216 |
| 2019/0159424 A1 | * | 5/2019 | Liu | A01K 1/0121 |

\* cited by examiner

TOILET SEAT FOR ANIMALS

CLAIM OF PRIORITY

This application is a non-provisional application which claims priority to U.S. Provisional Application No. 63/011,393 filed Apr. 17, 2020. The disclosure of which is incorporated herein by reference.

FIELD OF THE EMBODIMENTS

The field of the invention and its embodiments relate to toilet seats for animals. In particular, the present invention and its embodiments provide an alternative to litter for use with cats by training the cat to use existing toilet facilities in the owner's home.

BACKGROUND OF THE EMBODIMENTS

Many pets, especially cats, can be trained to use a litter box placed within a pet owner's home. However, litter boxes can be unsightly, unsanitary, and must be routinely cleaned and the litter changed. During use, litter can be accidentally moved out of litter box by a pet and litter boxes can emit unappealing smells. It is for these reasons that many pet owners prefer options other than litter boxes.

The most utilized alternative to a litter box is to train a pet to go to the bathroom outside. However, for many people, such a choice is not possible. Many people do not have the time in their schedules to walk or let their pets out at necessary times. Furthermore, many pets cannot be safely let outdoors at all times of day and throughout the year.

If a pet owner does not want the hassle of a litter box and cannot train a pet to go outside, the most viable alternative is to train the pet to use the toilet. The way a pet can be trained to use a toilet is to position the litter atop the toilet. Eventually, a pet will get into the habit of going to the bathroom atop the toilet. Over time, the amount of litter positioned atop the toilet is decreased, until little or no litter is needed to entice the pet. The pet is then trained to use the toilet and the pet's waste can be flushed away.

Many of the known toilet litter trays have openings that lead to the underlying toilet. The size of the openings can often be enlarged by removing material from the suspended litter tray. However, it has been found that pets, especially certain cats, are tentative about perching themselves atop a toilet bowl. Often, a cat may be comfortable using a litter tray provided the hole to the underlying toilet is small. As soon as a pet owner enlarges the hole, the cat may refuse to use the litter tray and the training cycle is broken.

A need therefore exists for a pet training device that can train a pet to use a toilet, where the size of the opening exposed to the toilet gradually increases. A need also exists for a pet training device where the size of the hole exposed to the underlying toilet can be decreased as well as increased in order to meet the training requirements of a particular pet. In at least one embodiment, the animal seat is wider than the human seat associated with the toilet seat of the present application. These needs are met by the present invention as described and claimed below.

REVIEW OF RELATED TECHNOLOGY

U.S. Pat. No. 8,671,888 pertains to a cat toilet device includes a bottom part, a seat and a top part. The seat has a lip extending inward therefrom so as to support the top part. The top part has multiple apertures and a side hole is defined through a side of the top part. The cat is trained to use the cat toilet device to save the need of the cat litter. A slot is defined in the top face of the seat and a cup is engaged with the slot so as to receive tools for clearing the cat toilet.

U.S. Pat. No. 8,051,804 pertains to a system and method of customizing a flush toilet to help train an animal to utilize the toilet when making waste. A primary tray is provided. The primary tray is placed over the toilet. An opening is formed in the primary tray. If a pet in training becomes tentative, the opening is reduced in size or eliminated by the use of a supplemental tray. The supplemental tray is sized to cover only the part of the primary tray that holds litter. With the litter removed, the supplemental tray is placed atop or under the primary tray. If no opening is desired, no opening is formed. If a smaller opening is desired, an opening of the appropriate size is made in the supplemental tray. The supplemental tray is then filled with litter and is used to train an animal as if it were part of the primary tray.

U.S. Pat. No. 7,882,805 pertains to an apparatus for toilet training a pet includes a toilet seat adapted to be connected to a toilet bowl and formed with a first opening. A toilet seat cover is connected liftably to the toilet seat, and has a top cover surface, a bottom cover surface, and a second opening formed through the top and bottom cover surfaces, where the second opening is smaller than the first opening and has a size sufficient to permit the pet to squat on the top cover surface. A receptacle is disposed removably on the toilet seat cover and extends through the second opening in the toilet seat cover and the first opening in the toilet seat.

U.S. Pat. No. 6,418,880 pertains to a flush toilet for domestic pets. The flush toilet for removes excrement from pets such as cats and dogs so as to preserve the wellbeing of the environment and to reduce medical expenses due to the unsanitary condition created by such excrement if not removed.

U.S. Patent Application Publication 2019/0159424 pertains to a pet toilet seat for pets defecating at home and after they have defecated, their excrement can be directly washed away via the close stool, so it is very environmental and practical. It is easy to use: at first the first seat is connected to the close stool and then the second seat is disposed on the first seat and the cover is disposed on the second seat and can be opened. The pets can sit on the second seat to defecate, and the excrement can fall into the second seat's hole. The first seat which the pet owner uses is very clean, because the dirty things on the pets' feet can't fall down to the first seat.

SUMMARY OF THE EMBODIMENTS

The present invention and its embodiments relate to an improved apparatus for training a pet, particularly a cat, to use a human toilet. This is accomplished via the structure of the toilet seat which is design to provide comfort and security to the cat while providing a flexible litter to toilet transition.

The toilet seat preferably has a first seat and a second seat. The first seat and the second seat are preferably hingeably coupled to one another. A non-slip surface is provided on the second seat to provide a stable surface upon which the animal can be positioned when using the toilet. When the second seat is lifted, the toilet can be used by a human using the first seat. Further, training aids can be used with the toilet seat to ensure the animal becomes comfortable using the toilet seat. These training aids allow the opening in the second seat to be changed thereby providing a level of comfort and slow adjustment such that the animal becomes used to using the toilet.

In at first embodiment of the present invention there is a toilet seat having a first seat with a first opening; and a second seat with a second opening, wherein the second opening is smaller than the first opening.

In another embodiment of the present invention there is a toilet seat having a first seat with a first opening; and a second seat with a platform, wherein the platform extends from the second seat, wherein the platform has a sidewall and a support surface, and wherein the platform has a second opening and the second opening is smaller than the first opening.

In yet another embodiment of the present invention there is a toilet training system for an animal having a toilet seat configured to be coupled to a toilet bowl, the toilet seat having a first seat having a first opening and a second seat having a second opening, wherein the second opening is narrower than the first opening; and at least one insert configured to modify a size of the second opening.

In general, the present invention succeeds in conferring the following benefits and objectives.

It is an object of the present invention to provide a toilet seat that can be used with any toilet.

It is an object of the present invention to provide a toilet seat that can be used by both animal and human users.

It is an object of the present invention to provide a toilet seat for human use that has a seat for animal use hingeably coupled as a conventional toilet seat lid are coupled to one another.

It is an object of the present invention to provide a toilet seat that has a non-slip surface disposed thereon.

It is an object of the present invention to provide a toilet seat that trains an animal to use a toilet.

It is an object of the present invention to provide a toilet seat that provides a platform for an animal to rest upon.

It is an object of the present invention to provide a toilet seat that has more than one functional lid.

It is an object of the present invention to provide a toilet seat that allows for a size of the opening in the lid to be changed.

It is an object of the present invention to provide a toilet seat that can be used with or without litter as part of a training program.

DESCRIPTION OF THE PREFERRED EMBODIMENTS

Figure 1:
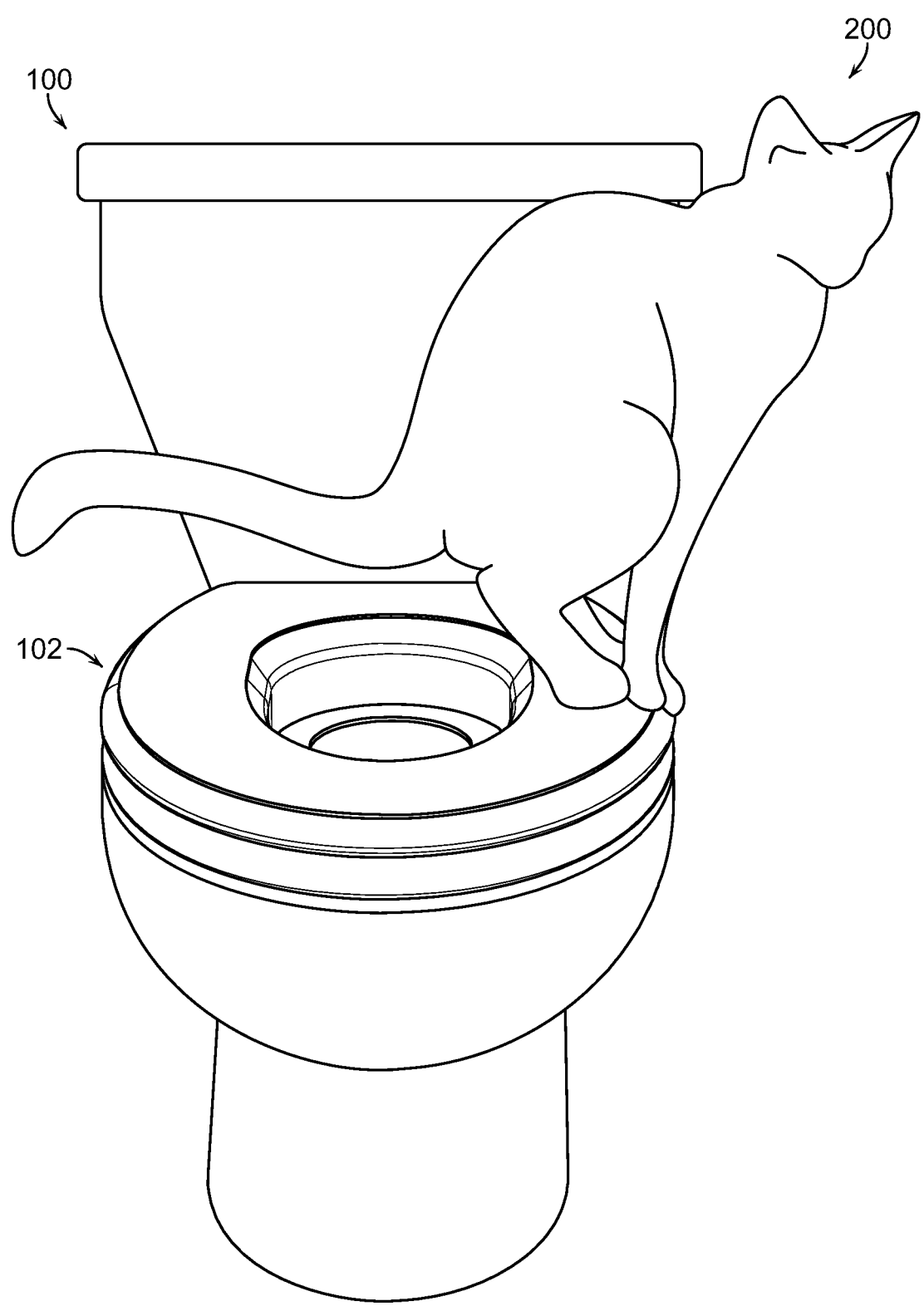
FIG. 1 illustrates a cat using an embodiment of a toilet seat of the present application.
Figure 2:
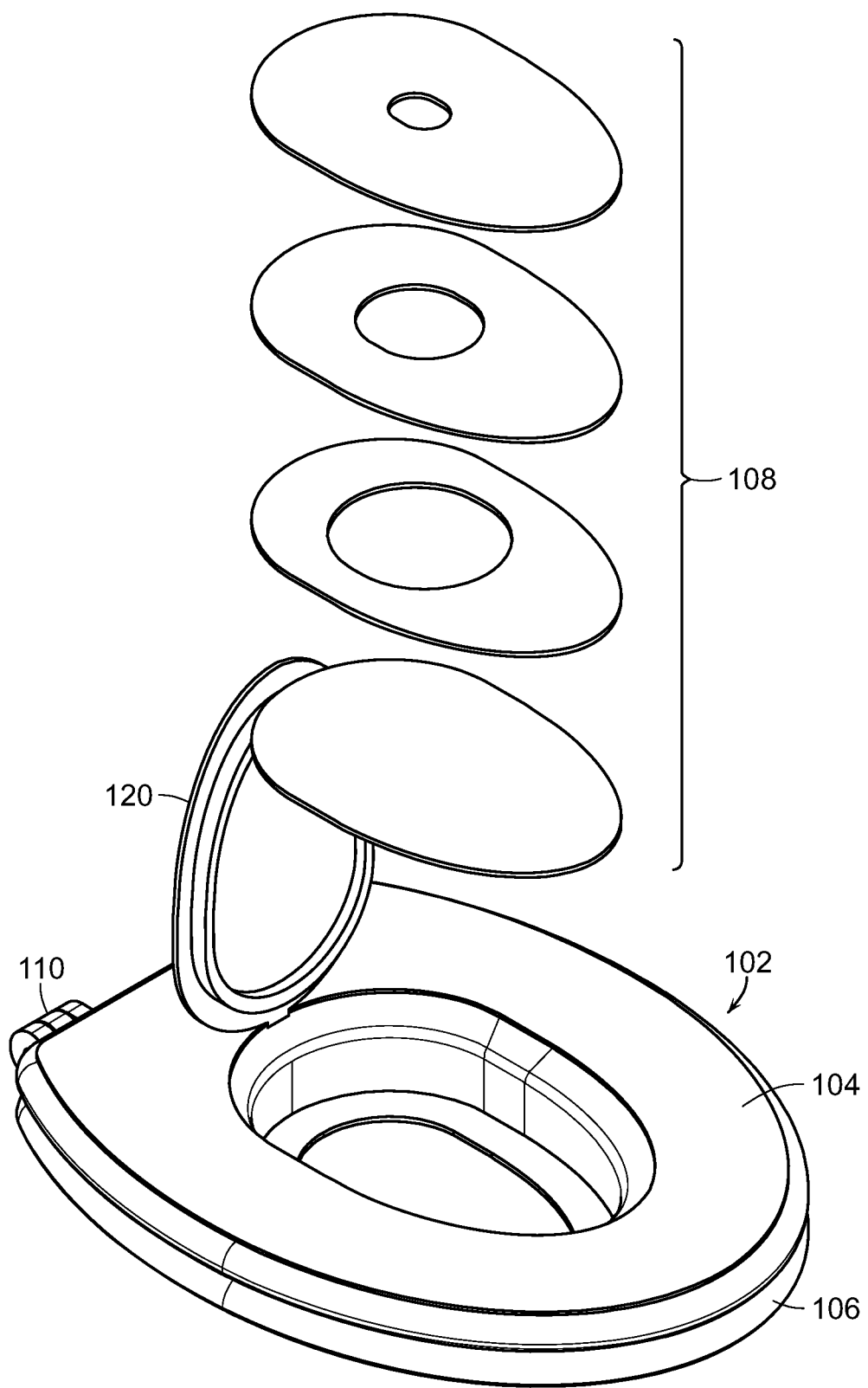
FIG. 2 shows an insert system associated with an embodiment of a toilet seat of the present application.
Figure 3:
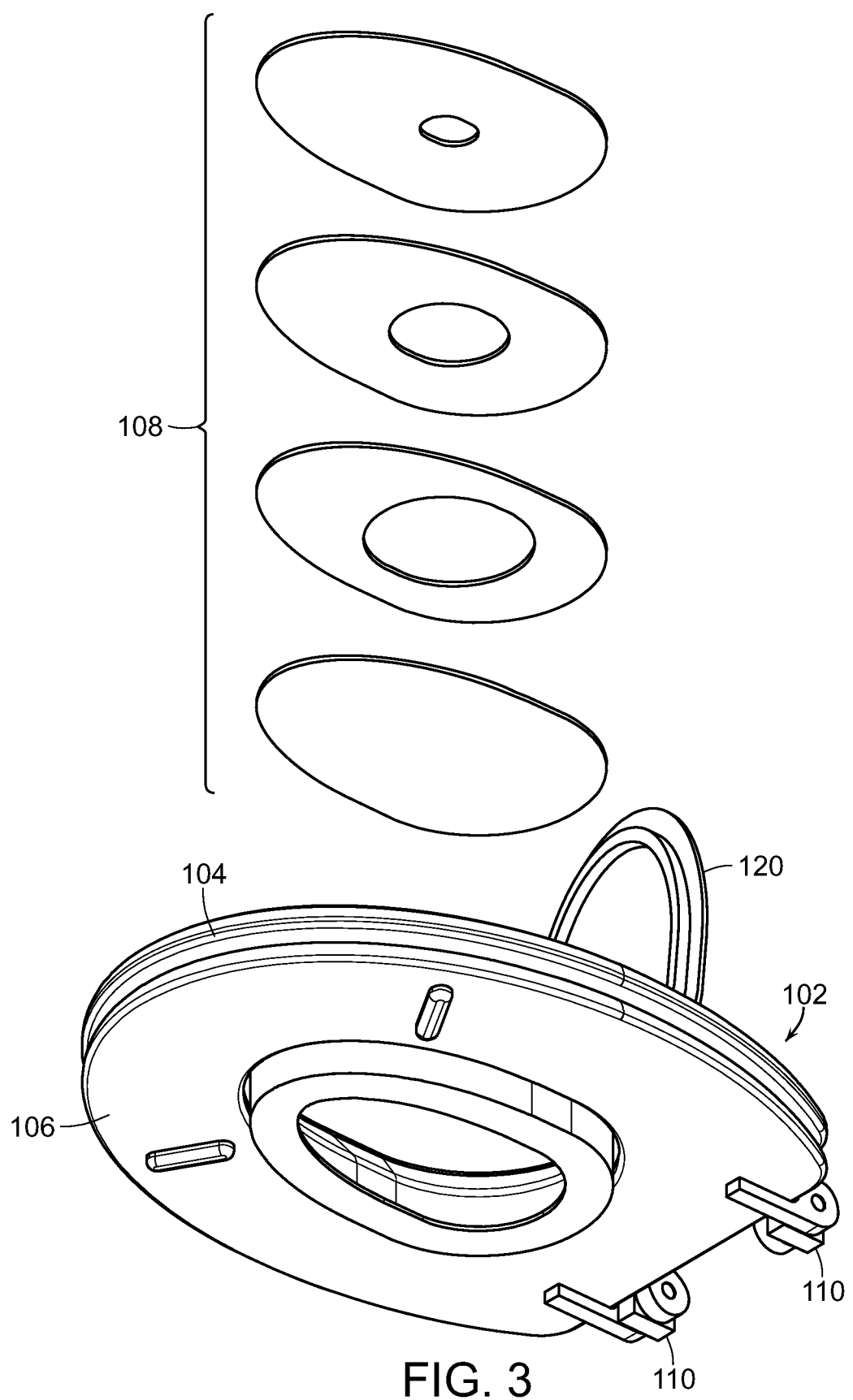
FIG. 3 shows a second view of an insert system associated with an embodiment of a toilet seat of the present application.
Figure 4:
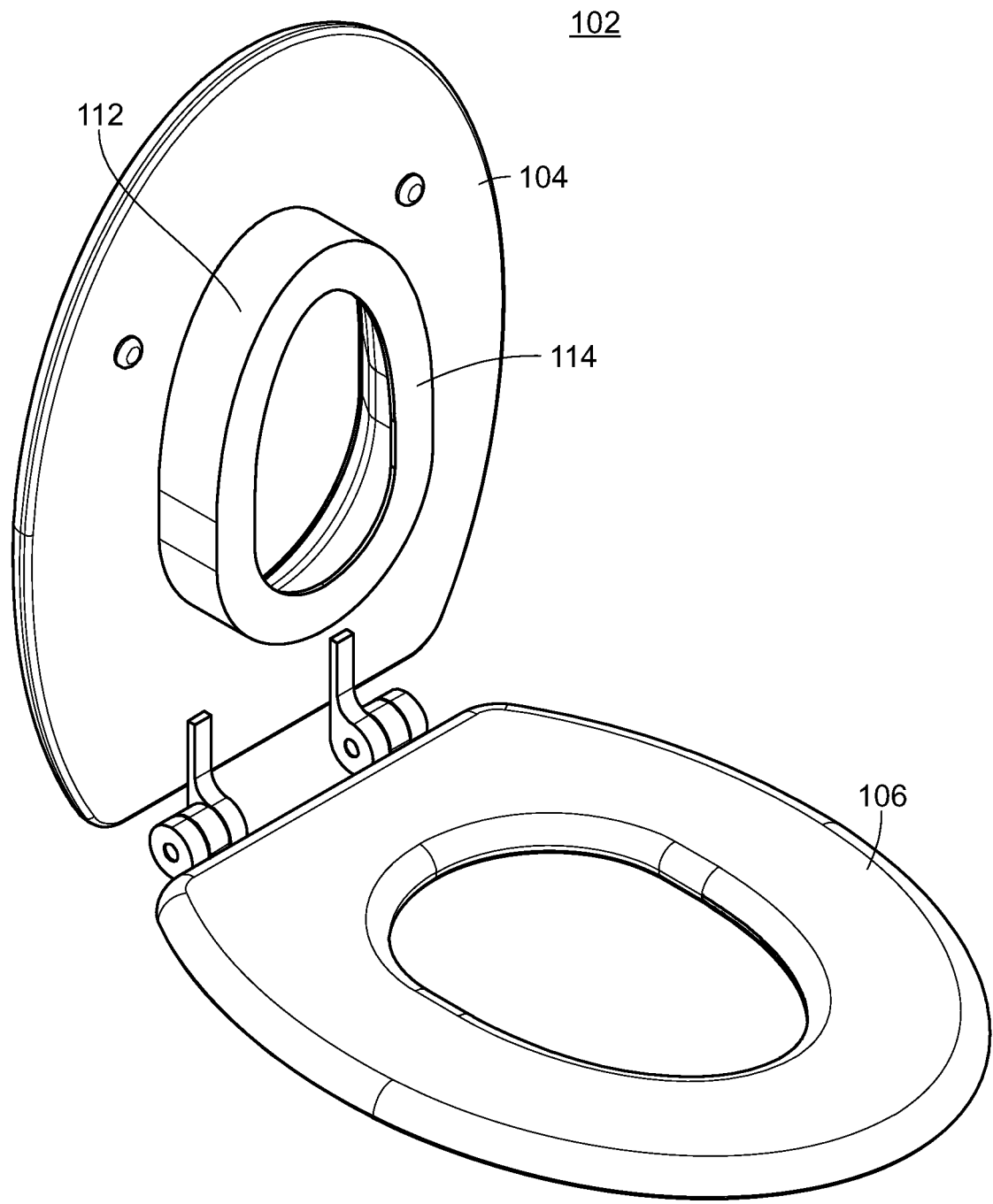
FIG. 4 demonstrates an embodiment of a toilet seat of the present application in an open position.
Figure 5:
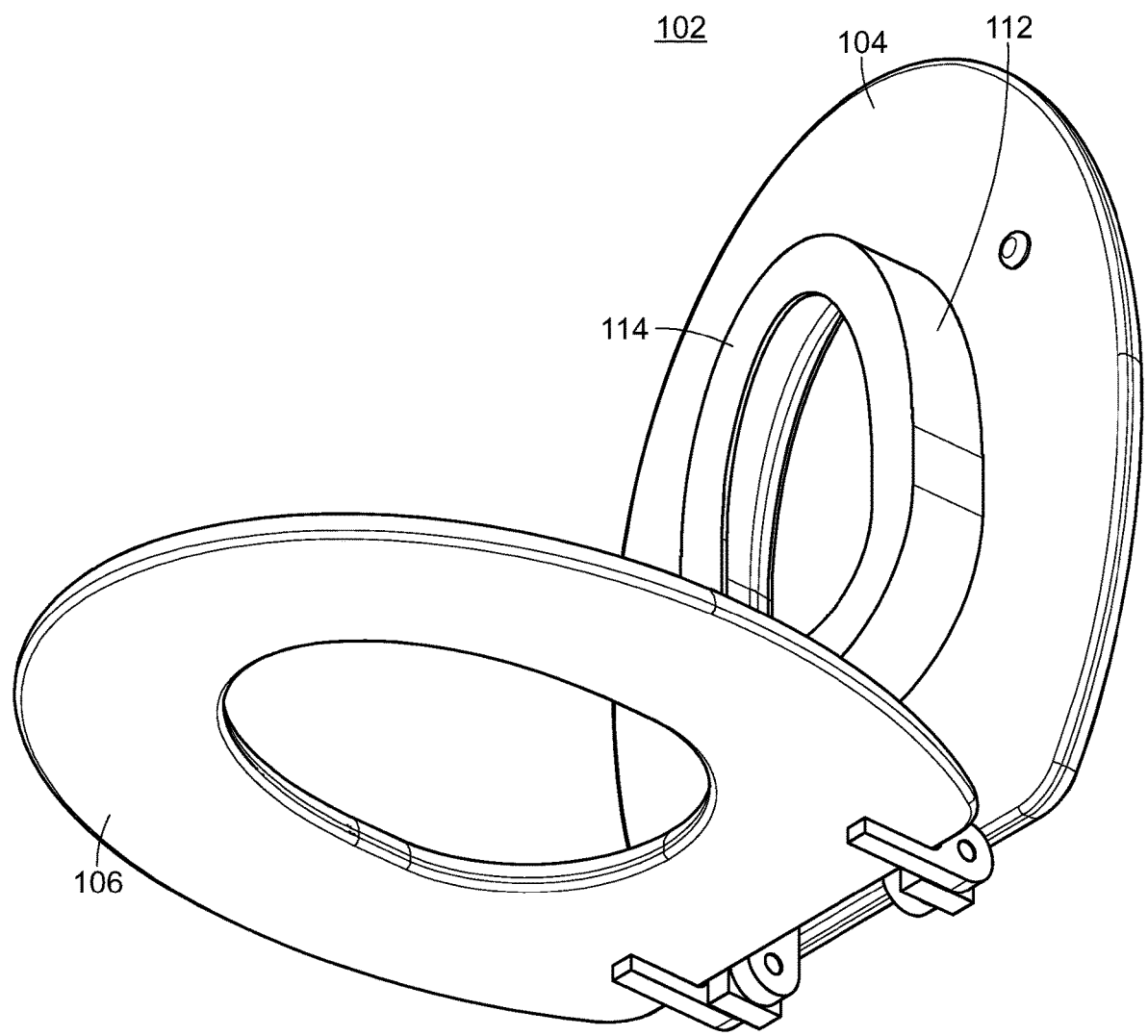
FIG. 5 demonstrates a second view of an embodiment of a toilet seat of the present application in an open position.
Figure 6:
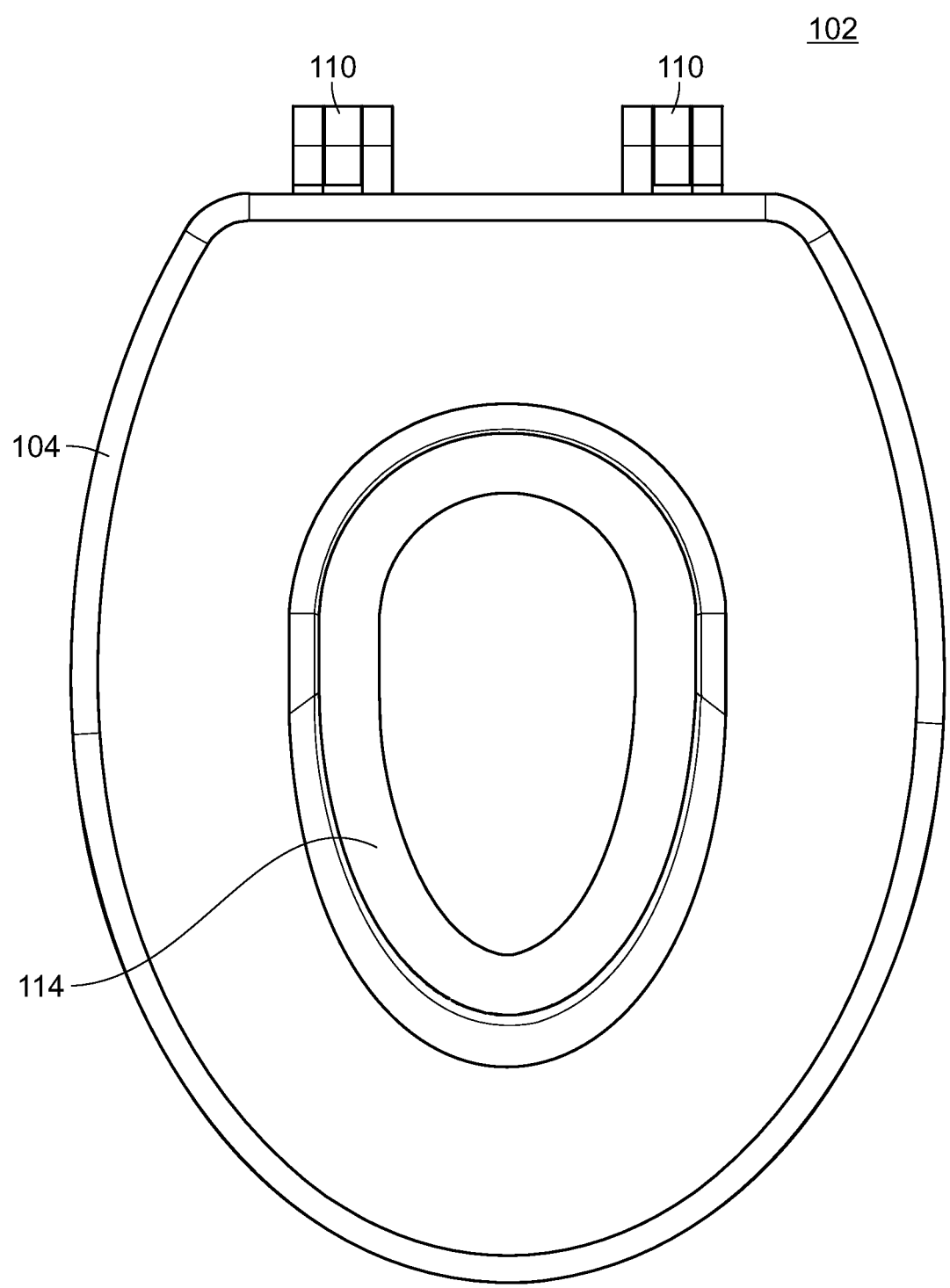
FIG. 6 is a top view of an embodiment of a toilet seat of the present application in a closed position.
Figure 7:
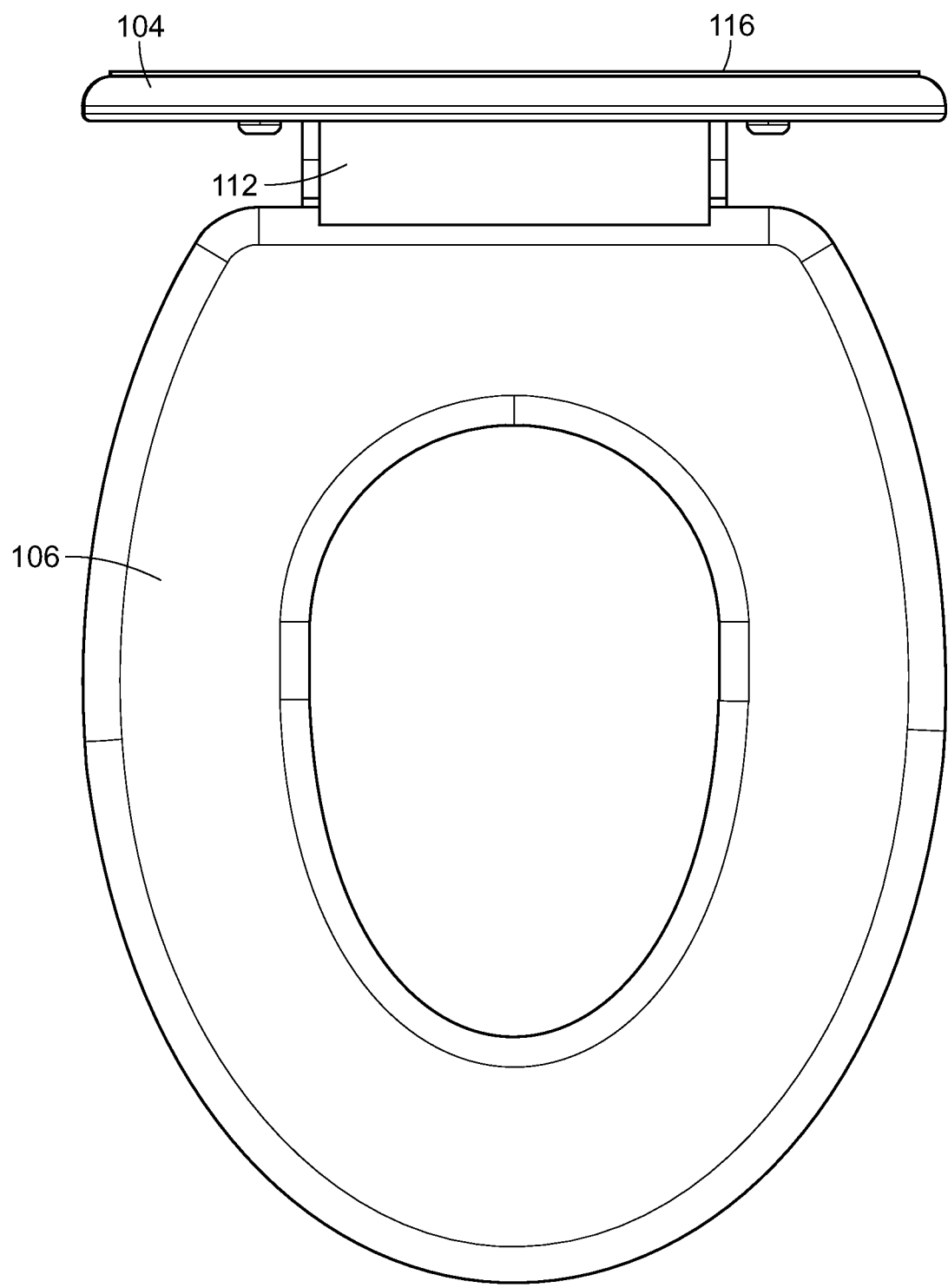
FIG. 7 is a top view of an embodiment of a toilet seat of the present application in an open position.
Figure 8:
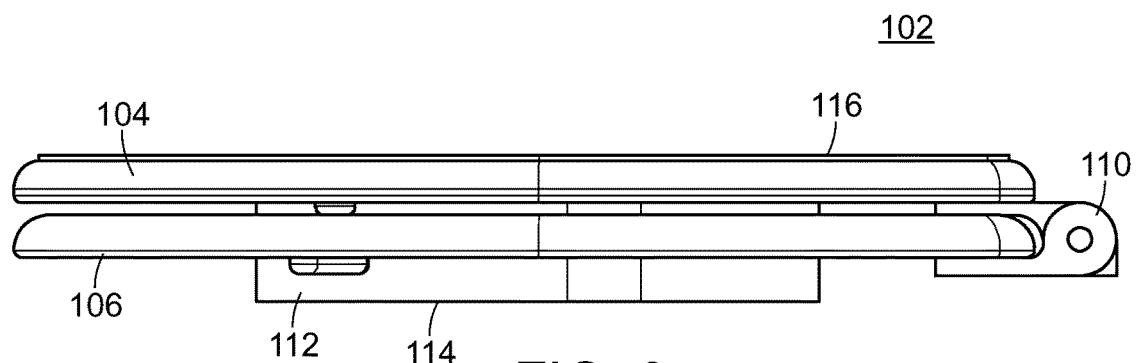
FIG. 8 is a side view of an embodiment of a toilet seat of the present application in a closed position.
Figure 9:
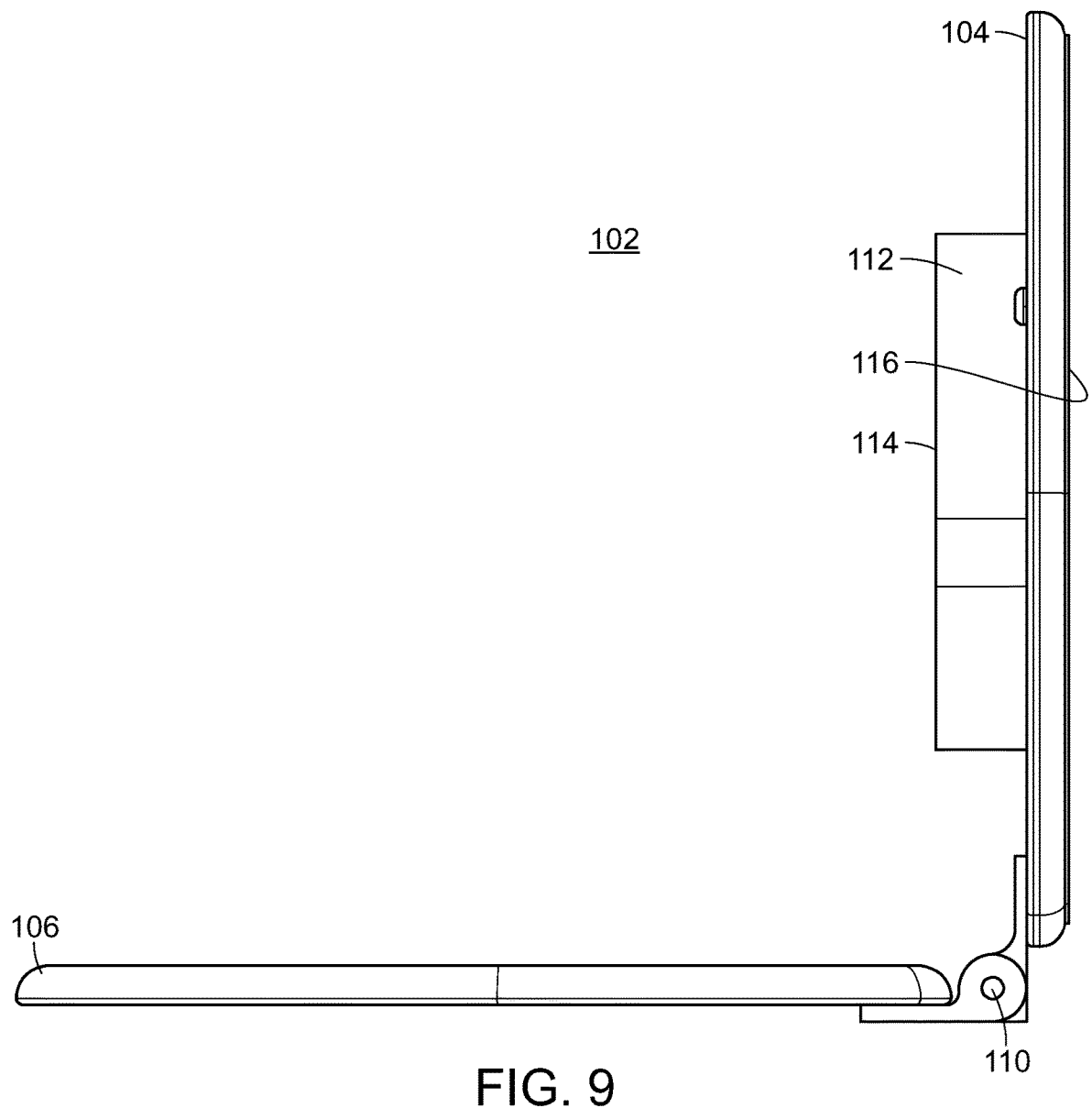
FIG. 9 is a side view of an embodiment of a toilet seat of the present application in an open position.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, there is an illustration demonstrating an intended end use of an embodiment of the present invention. Here, a pet 200 (in this case a cat) is using a human toilet 100 equipped with a toilet seat 102 of the present invention. The toilet seat 102 can be retrofit to any existing human toilet 100 or may come preinstalled with the new purchase of the human toilet 100.

FIGS. 2-9 illustrate the structure of the toilet seat 102. Generally, there is a first seat 106, a second seat 104, hinges 110, inserts 108, sidewall 112, platform 114, non-slip surface 116, and lid 120.

The first seat 106 may be a traditionally sized and shaped toilet lid. Such a toilet lid is preferably adapted for human use and contains an opening therethrough. The first seat 106 may be hingeably coupled to the second seat 104.

Second seat 104 is adapted for use by an animal such as a cat. Second seat 104 comprises an upper surface and a lower surface. Second seat 104 further comprises an opening therethrough. The second seat 104, in at least one embodiment, is wider than the first seat 106. This is a key feature that allows the animal to have ample room to position itself as well as to allow for the opening as described below.

On an upper surface of the second seat 104, there may be a non-slip surface 116. The non-slip surface 116 may be a number of surfaces including those surfaces that have a texture integrated into the surface or those surfaces that have an additional layer applied that adds the non-slip surface 116 to the upper surface of the second seat 104.

The opening of the second seat 104 is preferably narrower than the opening of the first seat 106. This is largely, in part, to the second seat 104 being adapted for use by an animal that is smaller than a human. This prevents an animal from falling through the opening and contacting the water within the toilet 100. The opening of the second seat 104 comprises a distinct structure adapted for use by an animal.

Here, the opening comprises a sidewall 112 and a platform 114. The sidewall 112 extends outward from a lower surface of the second seat 104. The sidewall 112 may extend outwardly for anywhere from about 0.5 inch to about 12 inches. Preferably, the sidewall 112 extends such that a lower surface of the platform 114 is lower than a lower surface of the first seat 102. The sidewall 112 is configured to generally conform to a shape of the opening of the second seat 104. The sidewall 112 is further preferably formed from the same material as the second seat, but may be formed from a separate material. In at least one embodiment, the sidewall 112 and the platform 114 are separable from the second seat 104. The sidewall 112 is also sized to prevent the animal and its waste from contacting the first seat 102.

The platform 114 may serve has a platform to support an animal when using the toilet seat 102. The platform 114 may vary in width but is preferably about ½ inch to about 6 inches and is design to not interfere with an animal's use of the toilet seat 102 when using the toilet seat 102. The upper surface of the platform 114 may further have the non-slip surface 116.

However, the platform 114 is intended to receive a number of inserts 108 as shown in FIGS. 10A-10D. The inserts 108 are configured to have openings of various sizes. The inserts allow an animal to become slowly accustomed to using the toilet seat 102 as opposed to, for example, a litter box.

The inserts 108 can be shaped to have various size openings. In at least one embodiment of the insert 108 there is no opening. This is intended to allow litter to be used with the second seat 104 as described below. When using this particular insert 108, a human must still be able to use the toilet 100 without spilling litter. Thus, lid 120 may be utilized to prevent spillage of litter and/or animal waste retained by the insert 108. The lid 120 is a simple lid coupled to the second seat 104. The lid 120 may have a locking mechanism or other mechanism to prevent it from moving from a desired position. The lid 120 is sized to completely cover the opening of the second seat 104 to prevent spillage of the litter and/or waste when the second seat 104 is maneuvered into a raised position (raised seat position shown in FIG. 9). Once the second seat 104 is returned to a down position the locking mechanism can be disengaged and the lid 120 lifted again to allow unfettered use by the animal.

In some instances, the inserts 108 are simply laid over the opening in the second seat 104. However, in other embodiments, there are securement mechanisms on an inner surface of the sidewall 112 located proximate to an upper surface of the platform 114. These securement mechanisms allow for the insert 108 to be snapped into or held in place to prevent the inserts from being inadvertently disturbed during use.

Figure 10A:
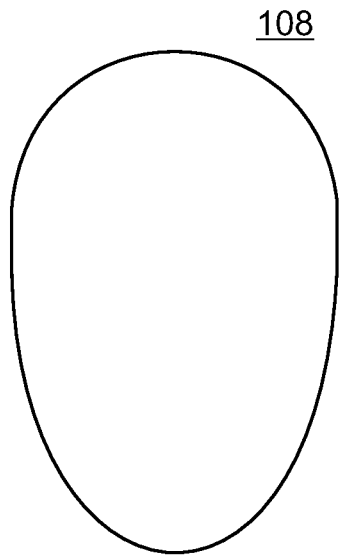
FIGS. 10A-10D show inserts to be used with an embodiment of a toilet seat of the present application having variably sized openings.
Figure 10B:
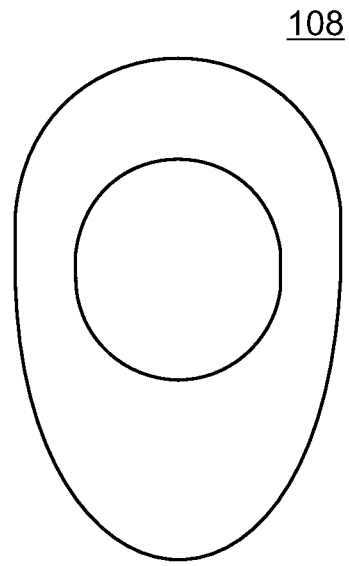
Figure 10C:
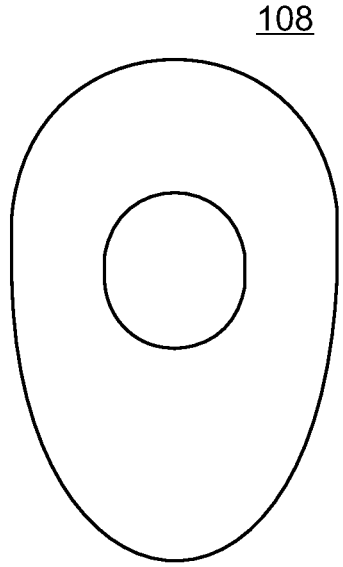
Figure 10D:
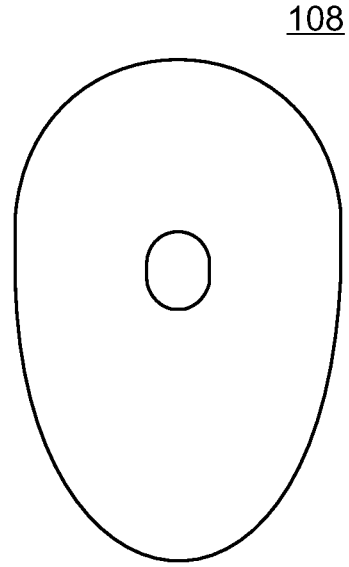

In practice, once an animal is beginning to be trained to use the toilet seat 102, the insert shown in FIG. 10A can be used. This insert 108 has no opening allowing for a traditional litter or other material to be placed thereon to create an environment to which the animal is accustomed. The insert 108 is freely removable thereby allowing litter and the like to be readily disposed. As the animal becomes more accustomed to using the toilet seat 102, the inserts shown in FIG. 10B, FIG. 10C, and FIG. 10D can be successively used to increase the diameter of the opening of the second seat 104. This, in turn, allows the animal to become slowly adapted to using the toilet seat 102 and becoming comfortable with this new arrangement.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A toilet seat comprising:
a first seat having a first opening;
a second seat having a second opening and a platform,
wherein a width of the second seat is greater than a width of the first seat,
wherein the platform is disposed below a top surface of the second seat,
wherein a non-slip material is disposed on a top surface of the second seat,
wherein the second opening is smaller than the first opening, and
wherein when the second seat is positioned upon an upper surface of the first seat, the platform extends below a bottom surface of the first seat,
wherein there is a non-slip material disposed on an upper surface of the platform,
wherein the sidewall of the platform is shaped to conform to a shape of the second opening in the second seat; and
a lid configured to selectively cover and uncover a portion of the second seat;
wherein for a human user to use the toilet seat, the second seat is to be in a raised position substantially perpendicular to the first seat in a lowered position and resting on a toilet bowl.

2. The toilet seat of claim 1 wherein the first seat is hingeably coupled to the second seat.

3. The toilet seat of claim 1 wherein the platform comprises a sidewall and a support surface.

4. The toilet seat of claim 3 wherein the second opening is in the support surface.

5. The toilet seat of claim 3 wherein a bottom surface of the support surface extends below a bottom surface of the first seat.

6. A toilet seat consisting of:
a first seat having a first opening and configured to be used by a human user;
a second seat hingably coupled to the first seat and configured to be used by a non-human user, the second seat having a platform,
wherein a width of the second seat is greater than a width of the first seat,
wherein a non-slip texture is integrated into a top surface of the second seat,
wherein the platform extends from a bottom surface of the second seat such that when the second seat is positioned upon an upper surface of the first seat, the platform extends below a bottom surface of the first seat,
wherein the platform has a sidewall and a support surface,
wherein there is a non-slip material disposed on a top surface of the support surface,
wherein the sidewall is shaped to conform to a shape of a second opening in the platform, and
wherein the platform has a second opening and the second opening is smaller narrower than the first opening; and
a lid configured to selectively cover and uncover a portion of the second seat;
wherein for a human user to use the toilet seat, the second seat is to be in a raised position substantially perpendicular to the first seat in a lowered position and resting on a toilet bowl.

7. The toilet seat of claim 6 wherein when the second seat is positioned upon the upper surface of the first seat, the sidewall of the platform obscures an inner periphery of the first opening of the first seat.

8. The toilet seat of claim 6 wherein the sidewall and platform are removable from the second seat.

9. A toilet training system for an animal consisting of:
a toilet seat configured to be coupled to a toilet bowl, the toilet seat having a first seat having a first opening and a second seat having a second opening,
  wherein the second opening is narrower than the first opening, and
  wherein the second seat has a platform such that when the second seat is positioned upon the first seat, the platform extends below a bottom surface of the first seat,
  wherein a width of the second seat is greater than a width of the first seat,
  wherein a non-slip texture is integrated into a top surface of the second seat,
  wherein there is a non-slip material disposed on a top surface of the support surface,
  wherein a sidewall of the platform is shaped to conform to a shape of the second opening in the second seat; and
a lid configured to selectively cover and uncover a portion of the second seat; and
more than one planar insert configured to modify a size of the second opening,
  wherein at least one of the more than one planar insert has no opening and at least one of the more than one planar insert has at least one opening,
    wherein the at least one opening is smaller than the second opening;
wherein for a human user to use the toilet seat, the second seat is to be in a raised position substantially perpendicular to the first seat in a lowered position and resting on a toilet bowl.

* * * * *